United States Patent [19]

Lapp

[11] Patent Number: 5,065,974
[45] Date of Patent: Nov. 19, 1991

[54] MIRROR MICRO-RADIAN ANGULAR ADJUSTMENT, LOCKING, AND MOUNTING DEVICE AND PROCESS

[75] Inventor: Roger H. Lapp, Silver Spring, Md.
[73] Assignee: The Johns Hopkins University, Baltimore, Md.
[21] Appl. No.: 509,383
[22] Filed: Apr. 16, 1990
[51] Int. Cl.$^5$ .............................. A47G 1/24
[52] U.S. Cl. ..................... 248/476; 372/106
[58] Field of Search .............. 248/475.1, 466, 476, 248/487, 278, 485; 350/631, 632, 633, 634, 357, 636; 372/107, 65

[56]   References Cited

U.S. PATENT DOCUMENTS

| | | | |
|---|---|---|---|
| 3,897,139 | 7/1975 | Carudo | 248/477 |
| 4,060,314 | 11/1977 | Heinz | 248/487 X |
| 4,066,342 | 1/1978 | Arends | 350/633 |
| 4,088,396 | 5/1978 | Edelstein | 350/634 |
| 4,439,862 | 3/1984 | Mohler | 372/108 X |
| 4,640,591 | 2/1987 | Cutburth | 248/487 X |
| 4,648,692 | 3/1987 | Kinoshita | 248/479 X |
| 4,657,361 | 4/1987 | Eitel | 248/476 |
| 4,744,091 | 5/1988 | Gorisch | 372/107 |
| 4,807,839 | 2/1989 | Nettleton | 372/107 X |
| 5,004,205 | 4/1991 | Brown | 350/634 X |

*Primary Examiner*—J. Franklin Foss
*Attorney, Agent, or Firm*—Robert E. Archibald; Francis A. Cooch

[57] ABSTRACT

A device and process for adjusting, locking, and mounting a mirror. The device, in one embodiment, comprises three adjustor bolts which are threadably engaged with a mirror assembly and a support plate. Two locking bolts per adjustor bolt apply torque symmetrically to the adjustor bolt to preserve micro-radian adjustments during the locking process. The invention's design also results in extremely high structural stiffness at the adjustor-locking bolt joints.

15 Claims, 1 Drawing Sheet

MIRROR MICRO-RADIAN ANGULAR ADJUSTMENT, LOCKING, AND MOUNTING DEVICE AND PROCESS

STATEMENT OF GOVERNMENTAL INTEREST

The Government has rights in this invention pursuant to Contract No. N00039-89-C-5301 awarded by the Department of the Navy.

BACKGROUND OF THE INVENTION

This invention relates to adjustable mirror mounts, particularly for laser mirrors.

Numerous devices exist for adjusting mirrors which employ adjusting screws, e.g., U.S. Pat. Nos. 3,588,232; 4,066,342; 4,439,862; 4,744,091; and 4,807,839. However, the prior art suffers from an inability to maintain a micro-radian angular adjustment when an adjustment locking means is applied. Further, most of the prior art mirror mounting devices, particularly those employing springs, e.g., U.S. Pat. Nos. 4,648,692 and 4,680,771, fail to achieve extreme structural stiffness when the adjustment means is locked. Finally, even in devices which may be capable of being locked without losing micro-radian adjustment, the design of the locking means requires so many parts as to preclude relatively high structural stiffness when locked; see, e.g., U.S. Pat. No. 4,060,314.

SUMMARY OF THE INVENTION

The problems described above are solved, to a great extent, through the practice of the present invention. Illustratively, adjustor bolts are threadably engaged through a support plate and with a mirror assembly. Two locking bolts for each adjustor bolt, which locking bolts were previously inserted perpendicularly to the axis of the adjustor bolt into the support plate and the mirror assembly, respectively, are then tightened. Because the locking bolts, when tightened, apply torque symmetrically to the adjustor bolts, the adjustor bolts do not rotate and the micro-radian angular adjustment of the mirror assembly is preserved during the locking process. Further, because the invention is comprised of relatively few parts and the adjustor bolt-locking bolts joint is preloaded when the locking bolts are tightened to their design limit, structural stiffness is very high and the joints are immune to adverse vibrational environments. Finally, the design of the invention permits the adjustor bolts to function in a blind hole where conventional locking means could not be applied.

The present invention is simple and, hence, relatively easy and inexpensive to construct. Yet it solves the problems of the prior art by permitting and preserving micro-radian angular adjustments of laser mirrors while also achieving high structural benefits.

For a more complete appreciation of the invention, attention is invited to the following detailed description of a preferred embodiment of the invention taken with the figures of the drawings. The scope of the invention, however, is limited only through the claims appended hereto.

DETAILED DESCRIPTION OF THE PREFERRED EMBODIMENT

Figure 1:
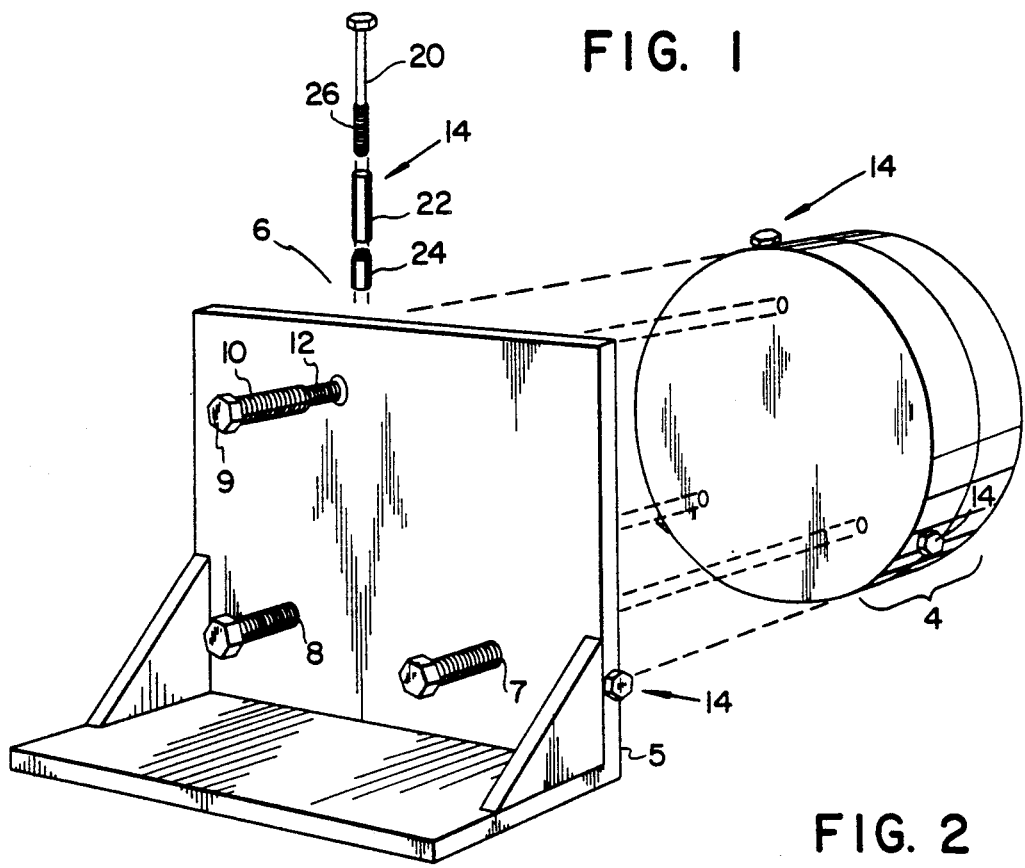
FIG. 1 is a perspective view of the preferred embodiment of the present invention.

An illustrative embodiment of the present invention is shown in FIG. 1 in which a mirror assembly 4 is mounted to a support plate 5 using three identical adjustor systems 6, 7, 8 in order to permit adjustments about two orthogonal axes, i.e., in both elevation and azimuth.

In this embodiment, the adjustor systems 6, 7, 8 are equally spaced on a ten inch radius circle where, when the mirror assembly 4 and support plate 5 are upright, the systems are located at the twelve o'clock, four o'clock, and eight o'clock positions on the circle. However, the adjustor systems do not have to be on the circumference of a circle and, if they are on a circle, they do not have to be evenly spaced thereabout; further, the circle need not have a ten inch radius. If independent elevation and azimuth adjustments are desired, then the adjustor systems must be in an orthogonal relationship with each other.

Figure 3:
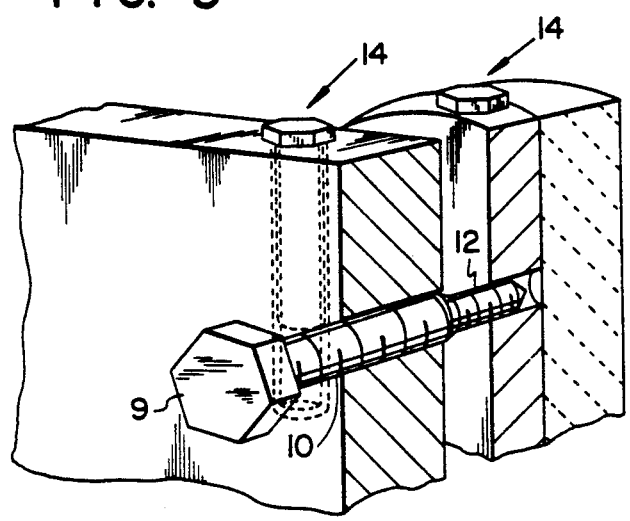
FIG. 3 is a partially cutaway cross-sectional view of the joint at one of the adjustor bolts of the present invention.

As shown in FIGS. 1 and 3, each adjustor system consists of an adjustor bolt 9 with a shaft having a stepped diameter with a larger diameter 10 and a smaller diameter 12. Both shaft diameters 10, 12 are threaded over their full length. The smaller diameter 12 is provided with more threads per inch than the larger diameter 10, i.e., the present invention includes all embodiments in which the larger diameter 10 has a larger thread pitch than the smaller diameter 12. In this embodiment, the larger diameter 10 is threaded one inch outside diameter at twenty threads per inch and the smaller diameter 12 is threaded 0.90 inches outside diameter at twenty-one threads per inch with both diameters 10, 12 having the same hand threads (either both right hand or both left hand) to permit assembly.

Figure 2:
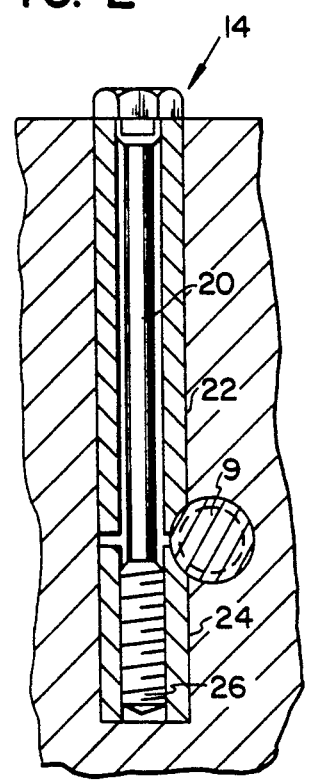
FIG. 2 is a partially cutaway cross-sectional view of a locking bolt of the present invention.

Each of the adjustor systems employs two, three part custom fitted, non-interchangeable locking bolts 14 for locking the adjustor bolt 9 and the micro-radian angular adjustment made therewith in position. Each locking bolt 14 (see FIGS. 1 and 2) consists of three parts: a locking screw 20 and first and second thread locks 22 and 24, respectively. The locking screw 20 includes a threaded portion 26 on its distal end which cooperates with the internal screw thread of the second thread lock 24. First thread lock 22 is slidably mounted on the smooth proximal end portion of the locking screw shaft. In one embodiment, as shown in FIG. 2, the diameter of the head or proximal end of locking screw 20 is no larger than the diameter of the bore in which the assembled locking bolt is inserted. This avoids having the locking screw head being in contact with the surface of either the support plate or mirror assembly and thereby limiting the ability to tighten the locking bolt properly.

The thread locks 22, 24 have formed on their exteriors at their junction when mounted on the lock screw shaft, an arcuately-shaped section containing custom thread grooves which match and engage the respective threads of the adjustor bolt 9. The arcuately-shaped section and thread grooves are formed equally on the exterior of each thread lock 22, 24.

There are two locking bolts per adjustor bolt, one locking bolt 14 having arcuately-shaped thread grooves on its thread locks 22, 24 which match the threads of the larger diameter 10 of the adjustor bolt, the other locking bolt 14 having its thread grooves matching the adjustor bolt's smaller diameter 12. 0f each pair of locking bolts, one is inserted in the support plate 5 and one in the mirror assembly 4. The axis of each locking bolt may be oriented with any position tangent to the adjustor bolt 9 as long as the locking bolt axis is in a plane perpendicular to the axis of the adjustor bolt 9.

In operation, to mount the mirror assembly 4 on the support plate 5, the six locking bolts 14, two per adjustor bolt 9, are inserted, one of each pair in the mirror assembly 4 and the other of each pair in the support plate 5. Then, the three adjustor bolts 9 are threadably engaged through the support plate 5 and with the mirror assembly 4, the larger diameter 10 being engaged with the support plate and the smaller diameter 12 with the mirror.

Preliminary adjustments can now be made to the mirror assembly by rotating the adjustor bolts 9. In this embodiment, one revolution of the adjustor bolt will change the distance (S) between the support frame 5 and the mirror assembly 4 by the difference of the lead of the 2 threads of adjustor bolt shaft diameters 10, 12 according to the following equation:

$$S = 1/20 - 1/21 \qquad \text{Eq. 1}$$

Therefore
  S = 0.002381" per revolution of each adjustor bolt.

If the elevation of the mirror assembly 4 is adjusted by one revolution of the twelve o'clock adjustor bolt, the mirror assembly 4 pivots about the adjustor bolts at four and eight o'clock at a normal distance of 15 inches. Thus, the angular adjustment measured in micro-radians is according to the following equation:

$$\textit{Micro-radian angle } A = (S) * (1,000,000.) / (R) * (1 + \sin 30) \qquad \text{Eq. 2}$$

where:

$(R)*(1 + \sin 30) = 15''$ (Given)

Substituting R and S in equation 2 where
S = 0.002381" from equation 1

Therefore:
Midro-radian angle A = 158.73 micro-radians per adjustor turn.

Thus, micro-radian adjustment can be easily achieved.

The transfer function for azimuth adjustment of the mirror assembly 4 is the same as elevation; however, to assure no crosstalk between azimuth and elevation, one half of the adjustment is made on the four o'clock adjustor bolt and the other half on the eight o'clock adjustor bolt where one adjustor is rotated clockwise and the other counter-clockwise or vice versa. The pivotal distance for elevation is given above for this example as 15 inches. The pivotal distance for azimuth is 17.32 inches; hence, the azimuthal transfer function is inversely proportionally different.
Therefore:
  Micro-radian angle = 137.47 micro-radians per adjustor revolution.

To functionally achieve locking without loss of angular adjustment, the entire set of 6 cooperating locking bolts must be tightened to remove all radial and axial play in each of the threaded joints, but not so tight as to preclude making final angular adjustments. After final adjustment is complete, final locking may proceed without loss of final angular adjustment.

By tightening the locking screw 20 into the second thread lock 24, the thread locks 22, 24 are compressingly engaged with the threads of the adjustor bolt 9, thereby preventing any axial 10 and radial movement in the adjustor bolt and locking it in position. Further, as the locking bolts !4 are tightened, they apply two equal but opposite torques to the adjustor bolt shaft diameters 10, 12. Thus, the adjustor bolt 9 has no unbalanced torques to cause it to rotate and lose micro-radian adjustment. Finally, the locking bolt 14, when tightened to its design stress limit, preloads the joint so that its structural stiffness is very high and the joint is completely immune to adverse vibrational environments.

While the invention as described and claimed herein is manually operated, it is within the scope of the invention to have a remotely operated adjusting and locking device of the present invention for space or other hazardous locations.

The invention thus provides a mirror adjustment, locking and mounting device which permits micro-radian angular adjustment of mirrors, especially laser mirrors, while preserving the precision of the angular adjustment setting during the locking process due to the symmetrical application of torque as disclosed. The invention also maintains extremely high mirror mounting stiffness when the invention is locked.

What I claim is:

1. An angular adjustment and locking device, said device mounting a mirror assembly to a support plate, comprising:
   at least three adjustor bolts, said adjustor bolts being threadably engagted through said support plate and threadably engaged with said mirror assembly; and
   two locking bolts for each of said adjustor bolts, one of said locking bolts being inserted in said support plate and lockingly engaged with that portion of said adjustor bolt inside said support plate and the second fo said locking bolts being inserted in said mirror assembly and lockingly engaged with that portion of said adjustor bolt inside said mirror assembly, each of said locking bolts compressingly engaging an arcuately-shaped, threaded section of each of said locking bolts onto said adjustor bolts thereby applying torque symmetrically when tightened to each of said adjustor bolts and preventing both axial and radial movement in said adjustor bolts.

2. The device as recited in claim 1, wherein each of said adjustor bolts has a threaded shaft with a stepped diameter, the portion of said shaft with the larger diameter being threadably engaged with said support plate and the portion of said shaft with the smaller diameter being threadably engaged with said mirror assembly, the length of said shaft being threaded with like hand threads.

3. The device as recited in claim 2, wherein each of said locking bolts comprises:
   a locking screw, said locking screw having a shaft with a smooth proximal end portion and a threaded distal end portion;
   thread lock being slidably
   a first thread lock, said first mounted on said smooth proximal end portion of said locking screw shaft; and
   a second thread lock, said second thread lock being mounted on said threaded distal end portion of said locking screw shaft and threadably engaged therewith;

wherein an arcuately-shaped section containing thread grooves is formed at the exterior junction of said first and second thread locks, said section and said grooves being equally divided between said first and second thread locks, said grooves of one of said locking bolts exactly matching said threaded grooves of said smaller diameter shaft portion of said adjustor bolt and said grooves of the other of said locking bolts exactly matching said threaded grooves of said larger diameter shaft portion of said adjustor bolt, when said locking bolts are tightened said locking screws compressingly engaging said threaded, arcuately-shaped sections of said first and second thread locks onto said adjustor bolt thereby preventing both axial and radial movement in said adjustor bolt.

4. The device as recited in claim 3, wherein said larger diameter shaft portion has a larger thread pitch than said smaller diameter shaft portion.

5. The device as recited in claim 4, wherein said smaller diameter shaft portion has at least one more thread per inch than said larger diameter shaft portion.

6. The device as recited in claim 5, wherein said smaller diameter shaft portion has an outside thread diameter which is equal to or greater than the inside thread diameter of said larger diameter shaft portion.

7. The device as recited in claims 4 or 6, wherein said adjustor bolts are inserted in said support plate and said mirror assembly in an orthogonal relationship.

8. The device as recited in claim 7, wherein, when said adjustor bolts are inserted in said support plate and said mirror assembly, said adjustor bolts are on the circumference of a circle.

9. The device as recited in claim 8, wherein said adjustor bolts are inserted in said support plate and said mirror assembly in a ten inch radius circle equally spaced thereabout.

10. The device as recited in claim 9, wherein said larger diameter shaft portion is threaded one inch outside diameter at twenty threads per inch and said smaller diameter shaft portion is threaded 0.90 inches outside diameter at 21 threads per inch.

11. The device as recited in claim 10, wherein, when said support plate with said mirror assembly mounted thereon is in an upright position, said adjustor bolts are inserted at the twelve o'clock, four o'clock, and eight o'clock positions on said circle.

12. A method for making angular adjustments to and locking said adjustments on a mirror assembly mounted on a support plate comprising the steps of:

threadably engaging at least three threshold adjustor bolts through said support plate and into said mirror assembly; and locking each of said adjustor bolts with two locking bolts, one of said locking bolts being inserted in said support plate and lockingly engaged with that portion of said adjustor bolt inside said support plate and the second of said locking bolts being inserted in said mirror assembly and lockingly engaged with that portion of said adjustor bolt inside said mirror assembly;

wherein said locking step comprises the step of compressingly engaging an arcuately-shaped, threaded section of each of said locking bolts onto said adjustor bolts thereby applying torque symmetrically to each of said adjustor bolts and preventing both axial and radial movement in said adjustor bolts.

13. The angular adjustment and locking method as recited in claim 12, wherein said locking step further comprises, prior to said compressingly engaging step, the steps of:

tightening said locking bolts to remove all axial and radial play in each threaded joint but not so as to preclude making final angular adjustments; and making final angular adjustments to said mirror assembly.

14. The angular adjustment and locking method as recited in claim 13, wherein said making step comprises the steps of:

inserting said adjustor bolts in said support plate and said mirror assembly in an equally spaced relationship on the circumference of a circle; and adjusting elevation and azimuth of said mirror assembly by rotating said adjustor bolts.

15. The angular adjustment and locking method as recited in claim 13, wherein said making step comprises the steps of:

inserting said adjustor bolts in said support plate and said mirror assembly in a circle, said adjustor bolts being inserted at the twelve o'clock, four o'clock, and eight o'clock positions on said circle when said support plate with said mirror assembly mounted thereon is in an upright position;

adjusting elevation of said mirror assembly by rotating said twelve o'clock adjustor bolt; and adjusting azimuth of said mirror assembly by rotating one of said four o'clock or said eight o'clock adjustor bolts one half of the necessary distance and by rotating, in the opposite direction, the other of said four o'clock or said eight o'clock adjustor bolts one half of the necessary distance.

* * * * *

UNITED STATES PATENT AND TRADEMARK OFFICE
CERTIFICATE OF CORRECTION

PATENT NO. : 5,065,974

DATED : November 19, 1991

INVENTOR(S) : Roger H. Lapp

It is certified that error appears in the above—identified patent and that said Letters Patent is hereby corrected as shown below:

Column 4, line 31, delete "engagted" and substitute therefor
-- engaged --.

Column 4, line 38, delete "fo" and substitute therefor
-- of --.

Column 4, delete line 61.

Column 4, line 62, insert after second occurrence of "first", -- thread lock being slidably --.

Signed and Sealed this

Second Day of March, 1993

Attest:

STEPHEN G. KUNIN

Attesting Officer

Acting Commissioner of Patents and Trademarks